(12) United States Patent
Chun et al.

(10) Patent No.: US 7,192,223 B2
(45) Date of Patent: Mar. 20, 2007

(54) SERVO MOTOR DIE TAPPING UNIT

(75) Inventors: Victor Chun, Broadview Hts., OH (US); Michael Hajjar, Strongsville, OH (US); Frank Madej, Mentor, OH (US); Alexander B. Leibman, Strongsville, OH (US)

(73) Assignee: Danly IEM, LLC, Boston, MA (US)

( * ) Notice: Subject to any disclaimer, the term of this patent is extended or adjusted under 35 U.S.C. 154(b) by 379 days.

(21) Appl. No.: 10/417,428

(22) Filed: Apr. 15, 2003

(65) Prior Publication Data

US 2004/0009044 A1    Jan. 15, 2004

Related U.S. Application Data

(63) Continuation-in-part of application No. 09/917,202, filed on Jul. 27, 2001, now Pat. No. 6,547,496.

(51) Int. Cl.
*B23G 1/16* (2006.01)

(52) U.S. Cl. .................. 408/137; 408/102; 408/138; 408/141

(58) Field of Classification Search ............ 408/101, 408/102, 111, 137, 138, 141, 129, 142, 222
See application file for complete search history.

(56) References Cited

U.S. PATENT DOCUMENTS

| | | | | |
|---|---|---|---|---|
| 3,123,847 A | * | 3/1964 | Willis | 408/9 |
| 3,534,421 A | * | 10/1970 | Fink | 408/137 |
| 3,579,687 A | | 5/1971 | Hoshi et al. | |
| 3,597,782 A | * | 8/1971 | Quackenbush | 408/132 |
| 3,640,147 A | * | 2/1972 | Fantoni | 74/89.36 |
| 3,661,470 A | * | 5/1972 | O'Pry | 408/137 |
| 3,803,927 A | * | 4/1974 | Lawler | 74/89.31 |
| 4,050,835 A | * | 9/1977 | Womack | 408/11 |
| 4,692,072 A | | 9/1987 | Pfister et al. | |
| 4,911,588 A | * | 3/1990 | Ikemoto et al. | 408/137 |
| 5,143,161 A | * | 9/1992 | Vindez | 173/19 |
| 5,173,015 A | * | 12/1992 | Maynard | 408/137 |
| 5,238,338 A | * | 8/1993 | Stucky | 409/143 |
| 5,248,230 A | * | 9/1993 | Chung | 408/138 |
| 5,639,191 A | * | 6/1997 | Womack | 408/1 R |

(Continued)

FOREIGN PATENT DOCUMENTS

DE        31 45 372 A1    5/1983

(Continued)

OTHER PUBLICATIONS

European Search Report for European Patent Application No. 04 008 770, dated Oct. 17, 2005.

*Primary Examiner*—Monica Carter
*Assistant Examiner*—Michael W. Talbot
(74) *Attorney, Agent, or Firm*—Schnader Harrison Segal & Lewis, LLP

(57) ABSTRACT

A servo motor driven tapping unit for in die installation has a tap holder pitch adapter assembly mounted for removal while the unit is in the die to facilitate tap and pitch adapter replacement. In one embodiment, the tap holder pitch adapter assembly extends transversely to the servo motor axis, and is offset in another embodiment.

29 Claims, 5 Drawing Sheets

U.S. PATENT DOCUMENTS

| | | | |
|---|---|---|---|
| 6,322,298 B1 * | 11/2001 | Wada | 408/127 |
| 6,547,496 B2 * | 4/2003 | Chun et al. | 408/124 |
| 6,758,237 B2 * | 7/2004 | Sichler et al. | 137/318 |
| 6,802,678 B2 * | 10/2004 | Augis | 408/137 |
| 2002/0102142 A1 | 8/2002 | Augis | |

FOREIGN PATENT DOCUMENTS

| | | |
|---|---|---|
| EP | 0 394 925 A2 | 10/1990 |
| GB | 2031772 A * | 4/1980 |
| JP | 62107915 A * | 5/1987 |
| JP | 02116406 A * | 5/1990 |

* cited by examiner

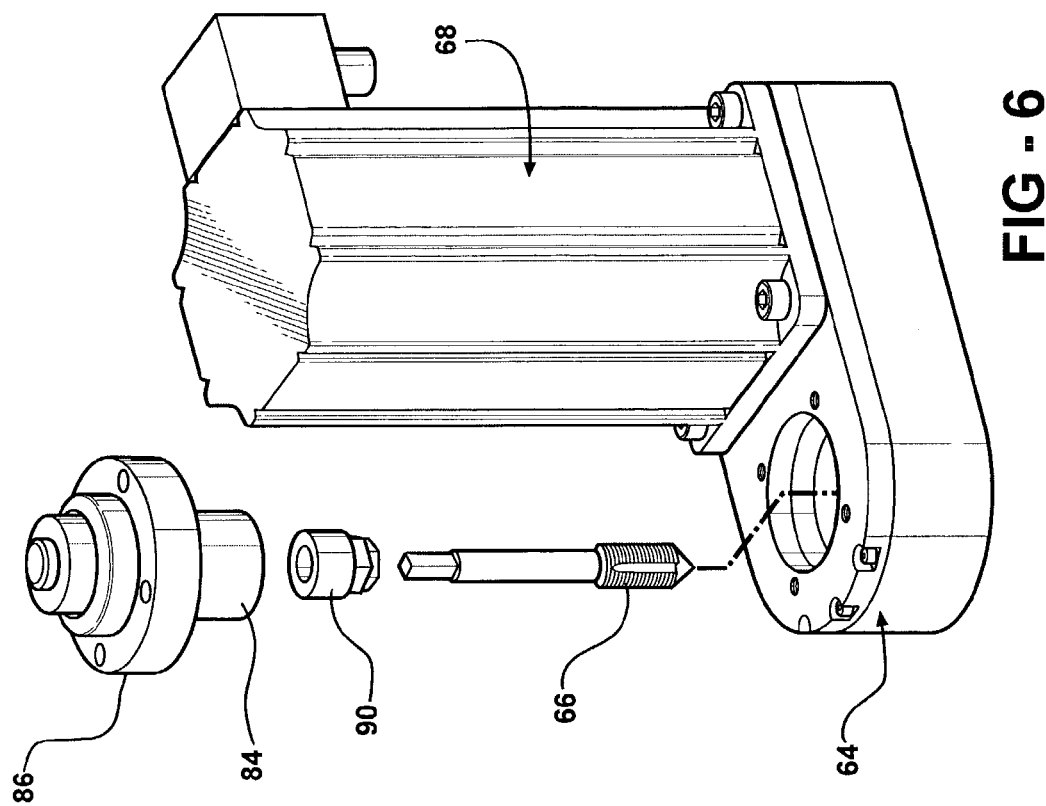
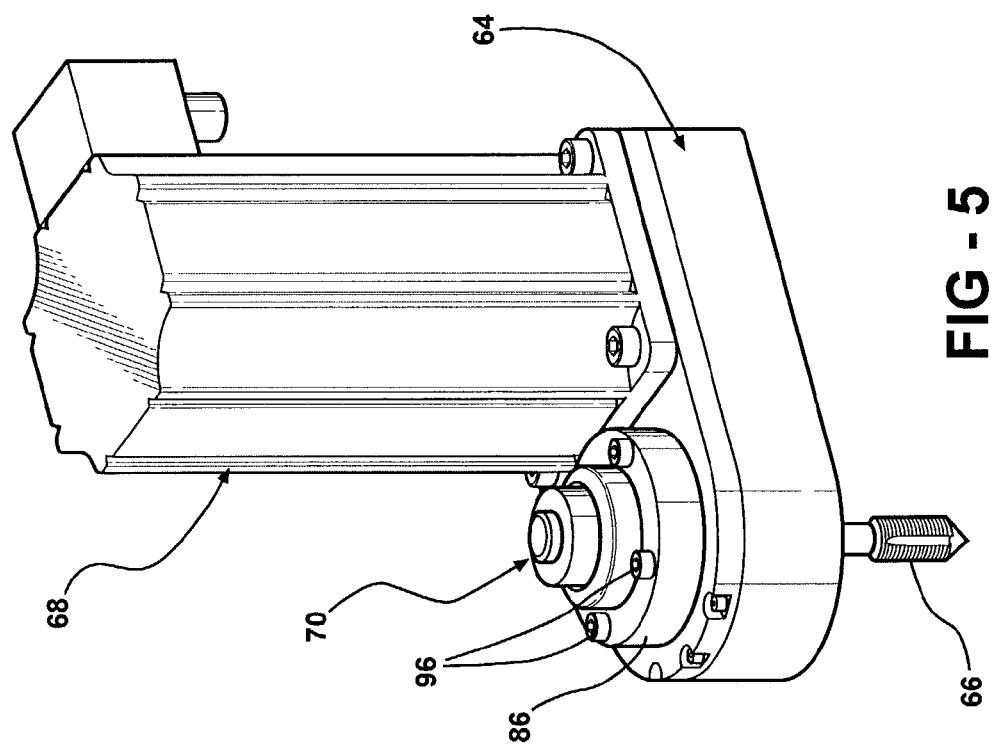

SERVO MOTOR DIE TAPPING UNIT

CROSS REFERENCE TO RELATED APPLICATION

This application is a continuation-in-part of U.S. Ser. No. 09/917,202, filed Jul. 27, 2001, now U.S. Pat. No. 6,547,496.

BACKGROUND INVENTION

This invention concerns tapping devices for forming threads in workpieces. Tapping is often necessary in manufacturing, and there have previously been developed in die tapping units to carry out tapping when the part is also been formed. It has long been the practice to operate such tapping units with the die press motion, as described for example in U.S. Pat. No. 5,173,015, and in U.S. patent application Publication No. 2002/0102142 and U.S. Pat. No. 6,547,496 issued from the parent application of the present application.

An in-die tapping unit which is operated by the press motion has certain disadvantages caused by the fact that presses are usually crank driven with a sinusoidal velocity. Since a tap has a maximum speed at which it can be used, and this cannot be greater than the peak press velocity, tapping is carried out for most of the cycle more slowly than would otherwise be possible. Also, the timing of the tapping is tied to the press motion, limiting flexibility in designing the process.

It has thus been proposed to use an electric servo motor to drive in die tapping unit to maximize the speed with which the tapping can be completed. Other advantages are the ease of tapping in various directions, and of executing tapping at any time during the press cycle.

Changing taps must be done frequently due to limited tap life, and when using a servo motor tap drive, changing taps has often required substantial down time due to the need to disassemble or remove the complete tapping units from the press in order to change a tap.

This problem is further exacerbated by the need to change pitch adapters having mating threads which control the rate of advance of the tap during tapping. These adapters must also be changed when changing tap sizes, and often this requires removal of the entire unit and disassembly in order to replace the pitch adapter.

It is the object of the present invention to provide an electro servo motor driven in die tapping unit which allows quick and easy replacement of taps and pitch adapters without the need to disassemble or remove the entire tapping unit.

SUMMARY OF THE INVENTION

The above recited objects and other objects which will become apparent upon a reading of the following specification and claims are achieved by an in die servo motor tapping unit which includes an electric servo motor and an attached housing for a tap holder and pitch adapter assembly in which the assembly is easily removable from the servo motor components and housing with the servo motor and components still in the die. The tap holder and pitch adapter assembly includes a tap drive gear driven by a servo motor output gear which tap unit is not coaxial with the servo motor output shaft and gear.

The tap drive gear is rotatably mounted in a housing mounted to the servo motor, the gear fixed to a hub to rotate the same when the servo motor is energized. The hub slidably receives a tap holder pitch adapter assembly which is also keyed to thereto establish a rotary connection.

The tap holder pitch adapter assembly is held within the hub by an external cover piece which is detachably fixed to a housing secured to the servo motor. The hub is keyed to an element of the tap holder pitch adapter assembly to allow sliding removal of the assembly from the hub when the cover piece is detached. This allows easier and quicker replacement of the tap or the pitch adapter elements when required. The tap holder pitch adapter assembly in two alternative versions may be mounted offset from the servo motor or at right angles respectively so as to allow removal of the top holder pitch adapter assembly from different directions.

DESCRIPTION OF THE DRAWINGS

FIG. 5 is a perspective view of a second embodiment of the servo motor tapping unit according to the invention.

FIG. 6 is a partially exploded perspective view of the servo motor tapping unit shown in FIG. 5.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
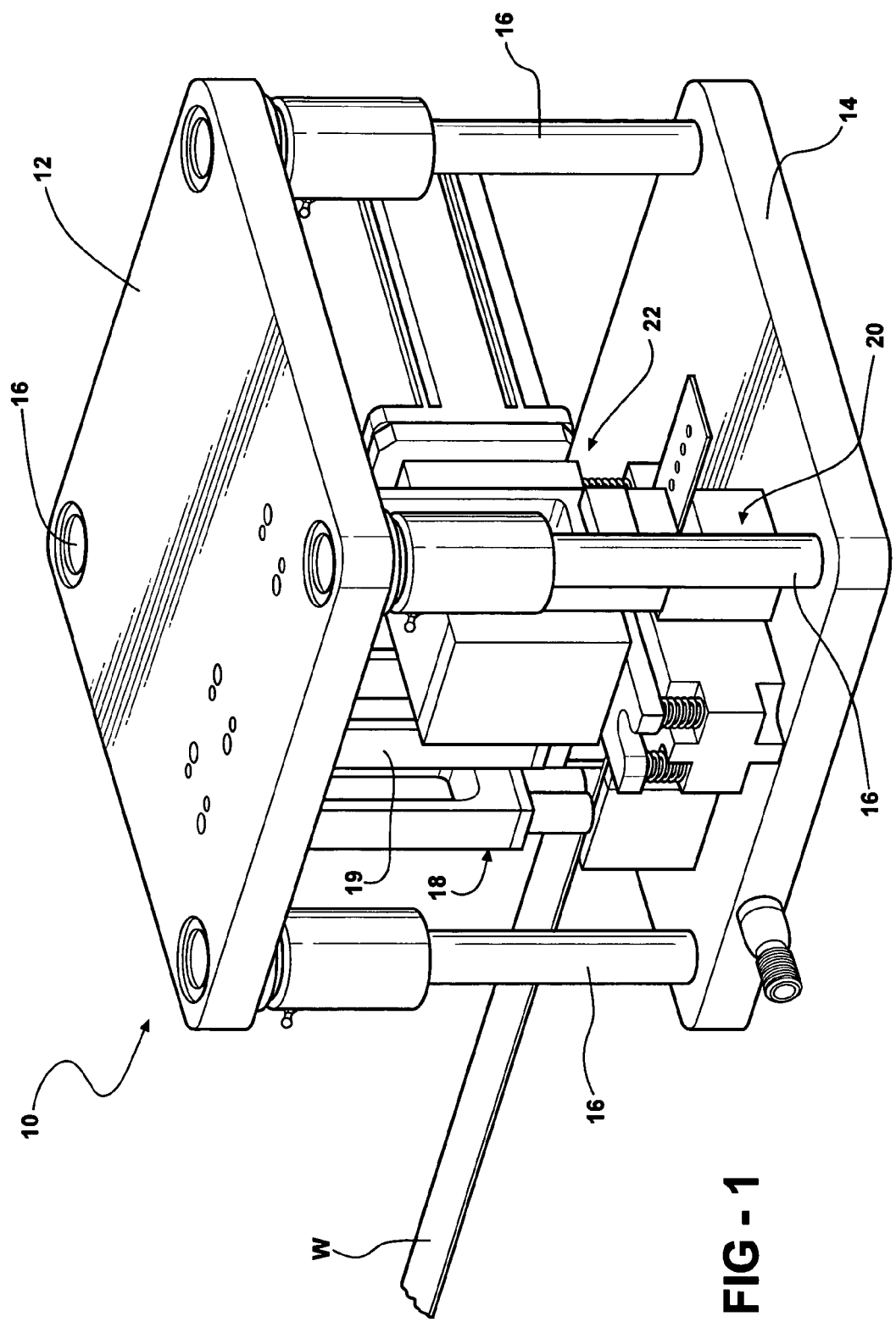
FIG. 1 is a perspective view of a die having a servo motor tapping unit according to the invention in position thereon.
Figure 2:
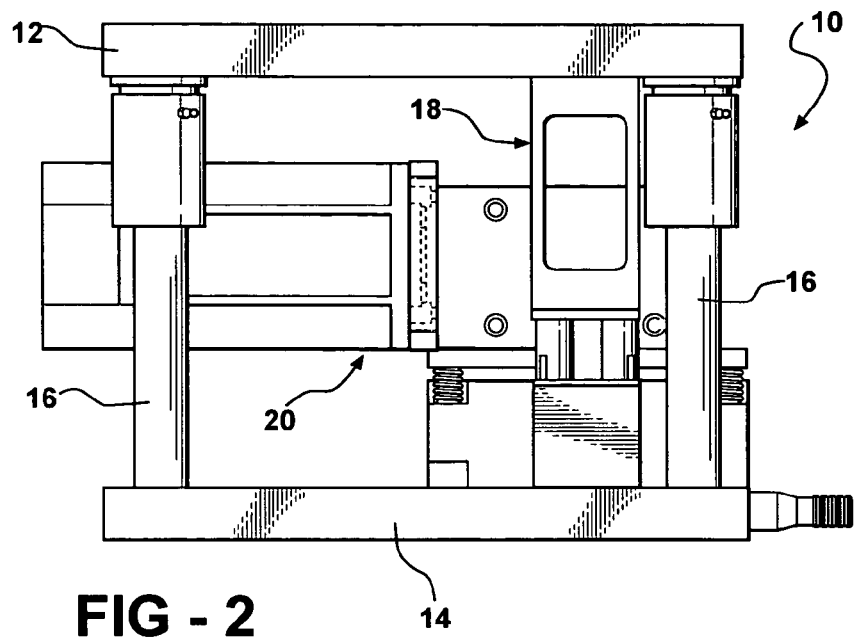
FIG. 2 is a side elevational view of the die shown in FIG. 1.

FIGS. 1 and 2 show a die assembly 10 including a spaced apart top plate 12 and bottom plate 14 adapted to be mounted in a press. The top plate 12 and bottom 14 plate are mounted on four guide posts 16 to guide movement together and apart induced by press motion in the manner well known in the art.

The die assembly 10 may have various progressive tooling mounted thereon acting on a workpiece W introduced therein, such as a punch swaging die set 18, and a cut off die set 20, operated by motion of the plates 12, 14.

A servo motor tapping unit 22 is positioned within the die plates 12, 14 by suitable mounting means (not shown).

Figure 3:
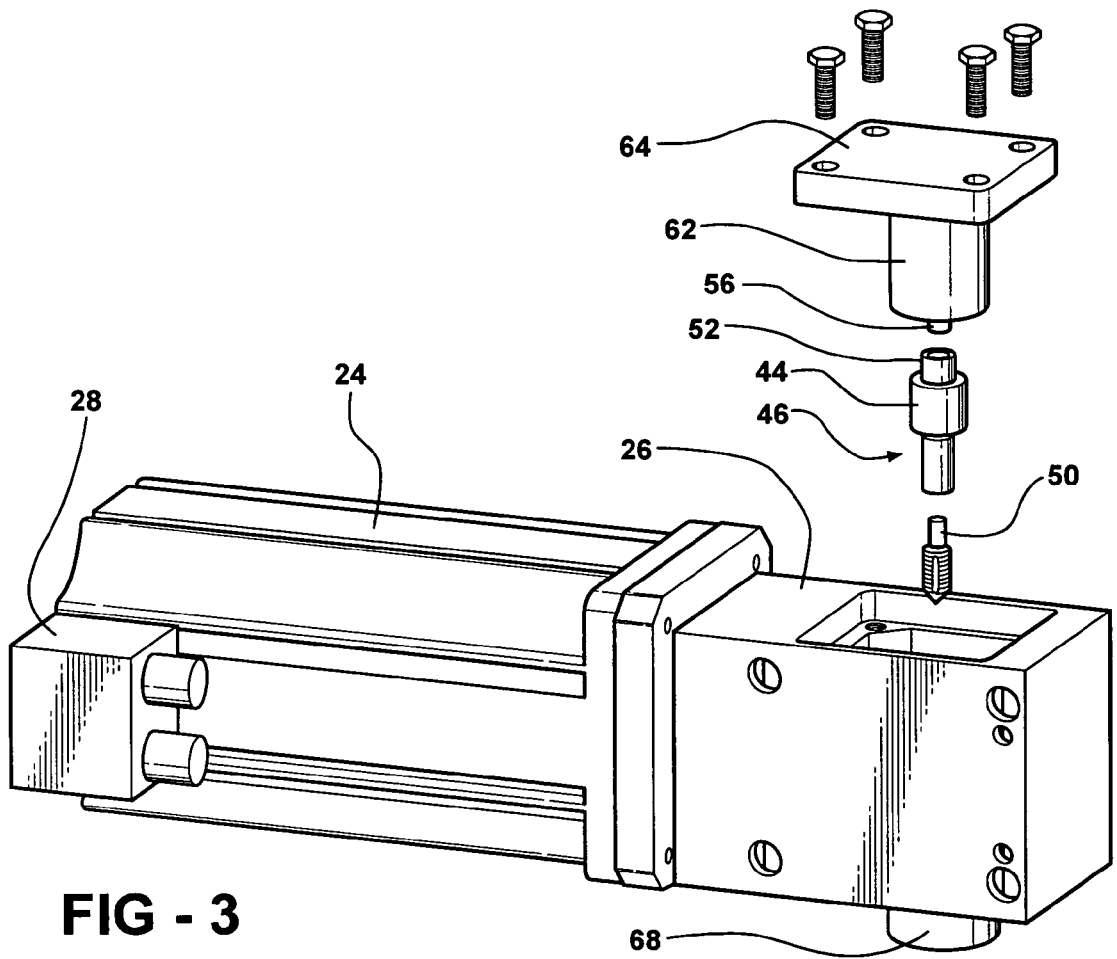
FIG. 3 is a partially exploded view of the servo motor tapping unit shown in FIGS. 1 and 2.
Figure 4:
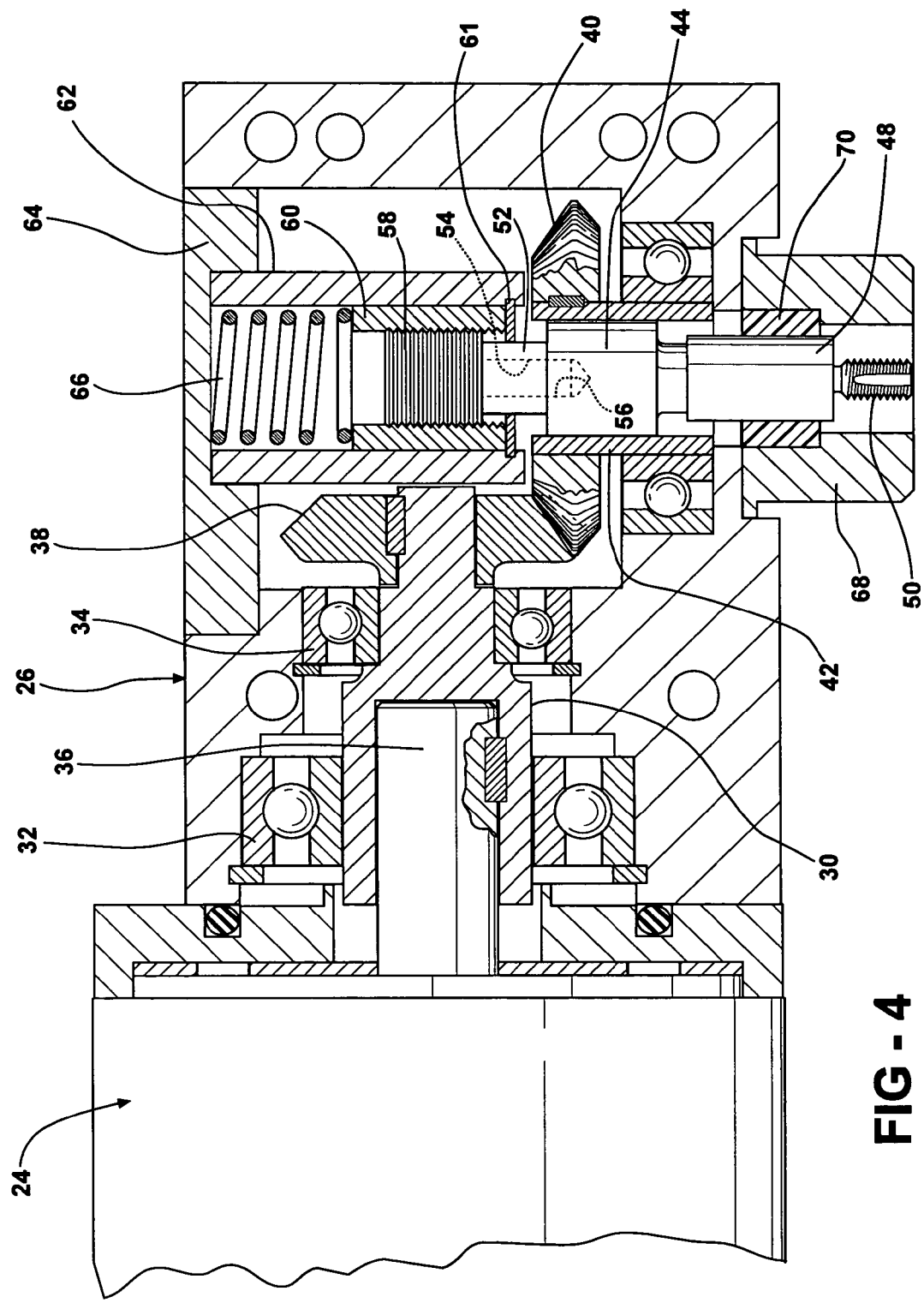
FIG. 4 is a fragmentary elevational view of the servo motor tapping unit of FIG. 3 shown in partial section.

FIGS. 3 and 4 show further details of the servo motor tapping unit 22, which includes an electrical servo motor 24 having a tap mounting assembly including a housing 26 affixed to one end of the servo motor 24. A connector box 28 allows connection of electrical and control cables (not shown).

The housing 26 provides support for a shaft extension 30 attached to servo motor output shaft 36 and bearings 32, 34 supporting the shaft extension 30.

The shaft extension 30 has a bevel gear 38 attached thereto meshed with a second bevel gear 40 attached to a hub sleeve 42 rotatable about an axis transverse to the axis of the servo motor 24.

The hub sleeve 42 is slidably keyed to a body portion 44 of a holder pitch adapter assembly 46, which also includes a collet tap holder 48 for releasably receiving the shank of a tap 50.

An adapter socket 52 is integral with the body portion 44 and has a threaded socket 54 receiving a threaded shank 56 of a replaceable externally threaded pitch adapter plug 58.

The pitch adapter plug 58 in turn is engaged with an internally threaded pitch adapter sleeve 60. The pitch of the engaged threads is matched to the pitch of the tap 50.

The pitch adapter sleeve 60 is keyed to a fixed outer sleeve 62 press fitted into a bore in an exterior plate cover piece 64 detachably fixed to the housing 26. A snap ring 61 limits the downward movement of the adapter sleeve 60 to insure that the adapter plug 58 and attached components are driven axially down when rotated.

A safety spring 66 is interposed between the inside of the plate cover piece 64 and the upper end of the adapter sleeve 60.

A boss 68 is affixed to the housing having a bore into which the tap 50 is recessed when retracted. A Delrin™ ring 70 prevents entry of dirt into the housing.

When the servo motor 24 is energized, the gear 38 is driven to drive gear 40, which rotates hub sleeve 42 affixed thereto.

The hub sleeve 42 in turn rotates the collet tap holder 48 and tap 50 received therein.

The pitch adapter plug 58 is also rotated, causing the attached tap holder 46 to advance axially as tapping proceeds. The adapter sleeve 60 is held rotationally stationary by the keyed connection to the fixed outer sleeve 62 and axially by the snap ring 61.

If the tap 50 cannot advance as due to the absence of a hole in the workpiece W, the safety spring 66 is compressed to allow the adapter sleeve 60 to instead move up to prevent breakage of the parts.

If the tap 50 is inaccessible in the die, the plate cover piece 64 can be detached and the outer sleeve 62, adapter sleeve 60, pitch adapter plug 50, and tap holder 48, and tap 50 are slid out as a unit from the top of the housing on a side opposite from where a tap 50 projects, as indicated in FIG. 3. This allows convenient replacement of the tap 50 and also changing the pitch adapter plug 58 and sleeve 42, with only minimal effort and time required.

Figure 7:
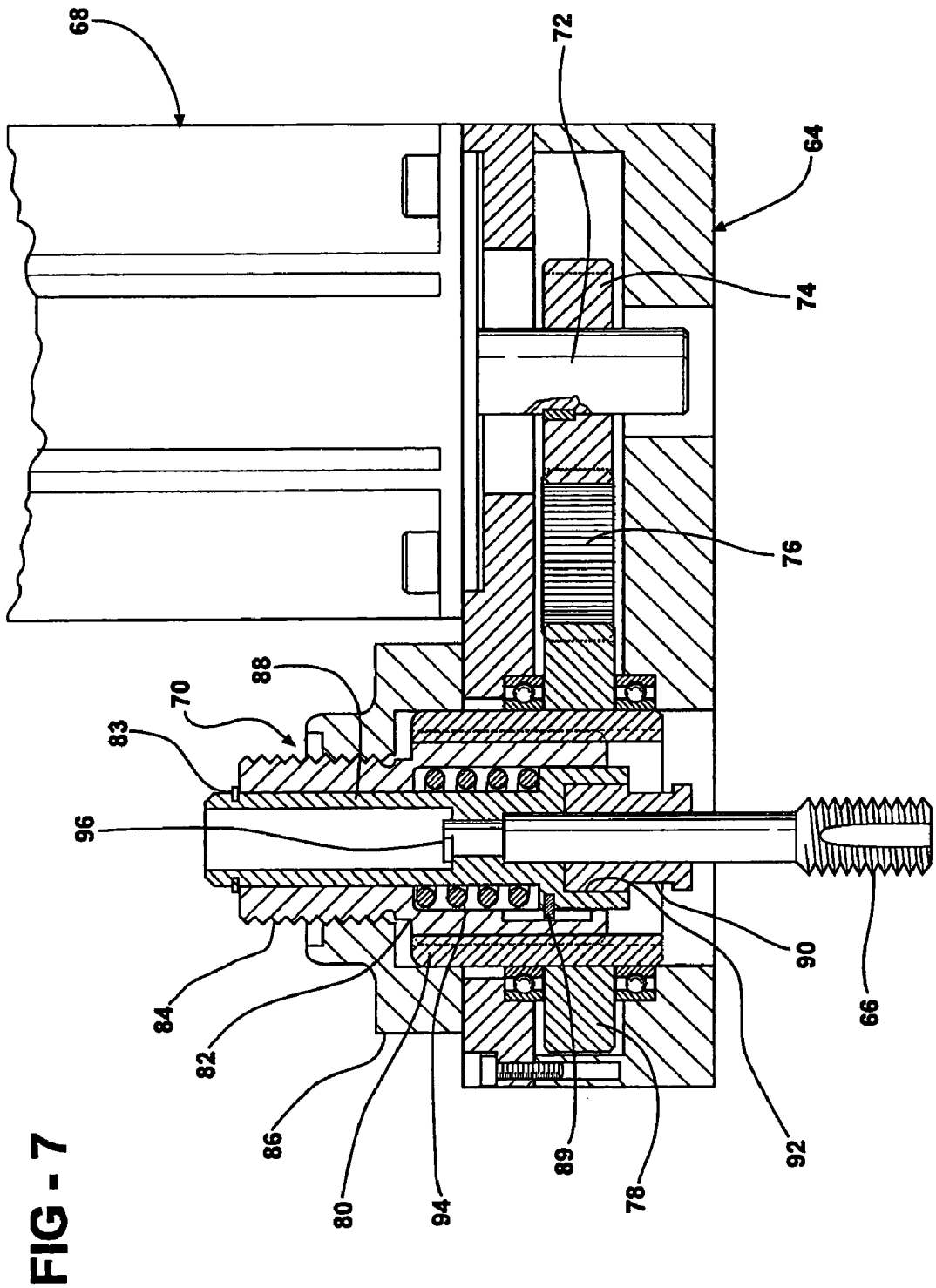
FIG. 7 is a fragmentary elevational view of FIGS. 5 and 6, shown in partial section.

FIGS. 5-7 show a second embodiment of the invention in which the tap mounting assembly including a housing 64 which is configured to offset the tap 66 from the axis of a servo motor 68.

The servo motor 68 has an output shaft 72 which has a pinion gear 74 affixed thereto driving an idler gear 76 which in turn drives a tap driver gear 78 affixed to a hub sleeve rotatably supported in the housing 64.

The hub sleeve 80 is keyed to pitch adapter 82 having an externally threaded extension 84 threadably engaged with an internally threaded cover cap piece 86 detachably affixed to the housing 64.

A tap holder sleeve 88 is slidably received in a bore in the pitch adapter 82 and slidably keyed thereto with a key 89 to be rotated when the pitch adapter 82 is rotated. A snap ring 83 acts as an axial stop, limiting axial movement of the tap holder sleeve 88 downwardly in the pitch adapter 82 as shown in FIG. 7 under the urging of a safety spring 94.

A taper grip collet 90 of a well known type threaded into an end bore 92 of the tap holder sleeve 88 is used to grip the tap 66 for retention therein upon being wrenched tight.

The tap holder sleeve 88 has a stepped outside diameter creating a shoulder engaged with one end of the safety spring 94, the other end engaging an internal step in the pitch adapter 82.

The tap square shank end 96 is received in a square hole formed in the inside of the tap holder sleeve 88 to establish a positive rotary connection and also to be advanced and retracted axially therewith.

When gear 78 is rotated by the servo motor 68, pitch adapter 82 is also rotated, the threaded engagement with the stationary cap cover piece 86 causing axial advance of the tap holder sleeve 88 down to rotate and advance the tap 66 in order to tap a hole in a workpiece (not shown). Reverse rotation backs the tap 66 out of the now threaded hole.

If the tap 66 or pitch adapter components 82, 86 need to be changed, the pitch adapter cap screws 96 are removed, and the tap holder pitch adapter assembly lifted out from the top of the housing 64 opposite the side through which the tap 66 projects, as shown in FIG. 6, without removal of the servo motor 68 or housing 64.

If the tap 66 cannot be advanced, the tap holder sleeve 88 will be driven up against the bias of the safety spring 94 to avoid breakage.

Thus, a servo motor tapping unit has been provided which allows quick replacement of taps and pitch adapters.

The invention claimed is:

1. A servo motor tapping unit for in die installations, comprising:
    a servo motor having an output shaft;
    a housing affixed to said servo motor and receiving said servo motor output shaft;
    a hub rotatably mounted in said housing and rotationally driven by said servo motor output shaft;
    a tap holder pitch adapter assembly slidably received in said hub with a rotational connection therebetween, said assembly including a tap holder for releasably securing a tap thereon projecting from one side of said housing, and a pitch adapter comprising a rotary threaded element rotated by said hub and a fixed threaded element arranged to advance or retract said tap holder upon rotation thereof in correspondence to the pitch of a tap held therein;
    a cover piece detachably attached to an external part of said housing on an opposite side from said one side of said housing to be removable therefrom, said cover piece holding and forming a part of said tap holder pitch adapter assembly, whereby said tap holder pitch adapter assembly is slidably removable from said opposite side of said housing with said cover piece remaining attached to said tap holder pitch adapter assembly upon detachment of said cover piece from said housing without disassembling the tap holder pitch adapter assembly.

2. The servo motor tapping unit according to claim 1 wherein said housing extends to one side of said servo motor and said hub is rotatable about an axis offset from said servo motor output shaft.

3. The servo motor tapping unit according to claim 1 wherein said hub is rotatable about an axis normal to said servo motor output shaft.

4. The servo motor tapping unit according to claim 3 wherein said tap holder includes a body portion slidable inside said hub while maintaining a rotary connection therewith and having a collet attached to said body portion releasably holding a tap.

5. The servo motor tapping unit according to claim 4 wherein said pitch adapter comprises a threaded plug attached to said body portion and extending into an internally threaded adapter sleeve engaged with said external thread of said plug, said sleeve restrained against axial movement so that said plug and tap holder are axially advanced upon rotation of said hub and body portion.

6. The servo motor tapping unit according to claim 5 wherein said cover piece comprises a plate having a holder sleeve affixed thereto projecting into said housing, and enclosing said adapter sleeve slidable therein while restraining rotation thereof.

7. The servo motor tapping unit according to claim 6 further including a safety spring interposed between said plate cover piece and said adapter sleeve to urge the same against an axial stop, said adapter sleeve driven axially to compress said spring in the event said tap holder is arrested from moving axially in an opposite direction.

8. The servo motor tapping unit according to claim 2 wherein said pitch adapter is elongated and has one end received in said hub to be slidable therein while maintaining a rotary connection therebetween and another end having an external thread formed thereon received in a threaded bore in said cover piece.

9. The servo motor tapping unit according to claim 8 wherein said tap holder includes a tap holder sleeve received in a bore in said pitch adapter and rotationally fixed thereto by a connection allowing sliding movement therein.

10. The servo motor tapping unit according to claim 9 wherein said tap holder sleeve has a tap holder collet received in an end of said tap holder sleeve opposite said externally threaded end of said pitch adapter.

11. The servo motor tapping unit according to claim 9 further including a safety spring interposed between aligned stepped shoulders on the outside of said tap holder sleeve and in said bore in said pitch adapter respectively and urging said tap holder sleeve against an axial stop acting between said tap holder sleeve and said pitch adapter to limit sliding travel of said tap holder sleeve in said pitch adapter.

12. The servo motor tapping unit according to claim 11 wherein said tap holder sleeve has a portion extending into said threaded one end of said adapter and receiving a snap ring abutting against an end face on said another end of said pitch adapter to comprise said axial stop.

13. A servo motor tapping unit for in die installations, comprising:
  a servo motor having an output shaft;
  a housing affixed to said servo motor and receiving said servo motor output shaft;
  a hub rotatably mounted about an axis normal to said servo motor output shaft in said housing and rotationally driven by said servo motor output shaft;
  a tap holder pitch adapter assembly slidably received in said hub with a rotational connection therebetween, said assembly including a tap holder for releasably securing a tap thereon projecting from one side of said housing, said tap holder having a body portion slidable inside said hub while maintaining a rotary connection therewith and having a collet attached to said body portion releasably holding a tap, and a pitch adapter comprising a rotary threaded element rotated by said hub and a fixed threaded element arranged to advance or retract said tap holder upon rotation thereof in correspondence to the pitch of a tap held therein;
  a cover piece detachably attached to an external part of said housing on an opposite side from said one side of said housing to be removable therefrom, said cover piece holding and forming a part of said tap holder pitch adapter assembly, whereby said tap holder pitch adapter assembly can be lifted from said opposite side of said housing with said cover piece upon detachment of said cover piece from said housing.

14. The servo motor tapping unit according to claim 13 wherein said pitch adapter comprises a threaded plug attached to said body portion and extending into an internally threaded adapter sleeve engaged with said external thread of said plug, said sleeve restrained against axial movement so that said plug and tap holder are axially advanced upon rotation of said hub and body portion.

15. The servo motor tapping unit according to claim 14 wherein said cover piece comprises a plate having a holder sleeve affixed thereto projecting into said housing, and enclosing said adapter sleeve slidable therein while restraining rotation thereof.

16. The servo motor tapping unit according to claim 15 further including a safety spring interposed between said plate cover piece and said adapter sleeve to urge the same against an axial stop, said adapter sleeve driven axially to compress said spring in the event said tap holder is arrested from moving axially in an opposite direction.

17. A servo motor tapping unit for in die installations, comprising:
  a servo motor having an output shaft;
  a housing affixed to said servo motor and receiving said servo motor output shaft; said housing extending to one side of said servo motor;
  a hub rotatably mounted about an axis offset from said servo motor output shaft in said housing and rotationally driven by said servo motor output shaft;
  a tap holder pitch adapter assembly slidably received in said hub with a rotational connection therebetween, said assembly including a tap holder for releasably securing a tap thereon projecting from one side of said housing, and a pitch adapter comprising a rotary threaded element rotated by said hub and a fixed threaded element arranged to advance or retract said tap holder upon rotation thereof in correspondence to the pitch of a tap held therein wherein the pitch adapter is elongated and has one end received in said hub to be slidable therein while maintaining a rotary connection therebetween and another end having an external thread formed thereon received in a threaded bore in said cover piece;
  a cover piece detachably attached to an external part of said housing on an opposite side from said one side of said housing to be removable therefrom, said cover piece holding and forming a part of said tap holder pitch adapter assembly, whereby said tap holder pitch adapter assembly can be lifted from said opposite side of said housing with said cover piece remaining attached to said tap holder pitch adapter assembly upon detachment of said cover piece from said housing.

18. The servo motor tapping unit according to claim 17 wherein said tap holder includes a tap holder sleeve received in a bore in said pitch adapter and rotationally fixed thereto by a connection allowing sliding movement therein.

19. The servo motor tapping unit according to claim 18 wherein said tap holder sleeve has a tap holder collet received in an end of said tap holder sleeve opposite said externally threaded end of said pitch adapter.

20. The servo motor tapping unit according to claim 18 wherein further including a safety spring interposed between aligned stepped shoulders on the outside of said tap holder sleeve and in said bore in said pitch adapter respectively and urging said tap holder sleeve against an axial stop acting between said tap holder sleeve and said pitch adapter to limit sliding travel of said tap holder sleeve in said pitch adapter.

21. The servo motor tapping unit according to claim 20 wherein said tap holder sleeve has a portion extending into said threaded one end of said adapter and receiving a snap ring abutting against an end face on said another end of said pitch adapter to comprise said axial stop.

22. A servo motor tapping unit for in die installations, comprising:
   a servo motor having an output shaft;
   a housing affixed to said servo motor and receiving said servo motor output shaft;
   a hub rotatably mounted in said housing and rotationally driven by said servo motor output shaft;
   a tap holder pitch adapter assembly slidably received in said hub with a rotational connection therebetween, said assembly including a tap holder for releasably securing a tap thereon projecting from one side of said housing, and a pitch adapter comprising a rotary threaded element rotated by said hub and a fixed threaded element arranged to advance or retract said tap holder upon rotation thereof in correspondence to the pitch of a tap held therein;
   a cover piece detachably attached to an external part of said housing on an opposite side from said one side of said housing to be removable therefrom, said cover piece holding and forming a part of said tap holder pitch adapter assembly, whereby said tap holder pitch adapter assembly is slidably removable from said opposite side of said housing with said cover piece upon detachment of said cover piece from said housing without disassembling the tap holder pitch adapter assembly;
   wherein said housing extends to one side of said servo motor and said hub is rotatable about an axis offset from said servo motor output shaft;
   wherein said pitch adapter is elongated and has one end received in said hub to be slidable therein while maintaining a rotary connection therebetween and another end having an external thread formed thereon received in a threaded bore in said cover piece; and
   wherein said tap holder includes a tap holder sleeve received in a bore in said pitch adapter and rotationally fixed thereto by a connection allowing sliding movement therein.

23. The servo motor tapping unit according to claim 22 wherein said tap holder sleeve has a tap holder collet received in an end of said tap holder sleeve opposite said externally threaded end of said pitch adapter.

24. The servo motor tapping unit according to claim 22 further including a safety spring interposed between aligned stepped shoulders on the outside of said tap holder sleeve and in said bore in said pitch adapter respectively and urging said tap holder sleeve against an axial stop acting between said tap holder sleeve and said pitch adapter to limit sliding travel of said tap holder sleeve in said pitch adapter.

25. The servo motor tapping unit according to claim 24 wherein said tap holder sleeve has a portion extending into said threaded one end of said adapter and receiving a snap ring abutting against an end face on said another end of said pitch adapter to comprise said axial stop.

26. A servo motor tapping unit for in die installations, comprising:
   a servo motor having an output shaft;
   a housing affixed to said servo motor and receiving said servo motor output shaft; said housing extending to one side of said servo motor;
   a hub rotatably mounted about an axis offset from said servo motor output shaft in said housing and rotationally driven by said servo motor output shaft;
   a tap holder pitch adapter assembly slidably received in said hub with a rotational connection therebetween, said assembly including a tap holder for releasably securing a tap thereon projecting from one side of said housing, and a pitch adapter comprising a rotary threaded element rotated by said hub and a fixed threaded element arranged to advance or retract said tap holder upon rotation thereof in correspondence to the pitch of a tap held therein wherein the pitch adapter is elongated and has one end received in said hub to be slidable therein while maintaining a rotary connection therebetween and another end having an external thread formed thereon received in a threaded bore in said cover piece;
   a cover piece detachably attached to an external part of said housing on an opposite side from said one side of said housing to be removable therefrom, said cover piece holding and forming a part of said tap holder pitch adapter assembly, whereby said tap holder pitch adapter assembly can be lifted from said opposite side of said housing with said cover piece upon detachment of said cover piece from said housing; and
   wherein said tap holder includes a tap holder sleeve received in a bore in said pitch adapter and rotationally fixed thereto by a connection allowing sliding movement therein.

27. The servo motor tapping unit according to claim 26 wherein said tap holder sleeve has a tap holder collet received in an end of said tap holder sleeve opposite said externally threaded end of said pitch adapter.

28. The servo motor tapping unit according to claim 27 wherein further including a safety spring interposed between aligned stepped shoulders on the outside of said tap holder sleeve and in said bore in said pitch adapter respectively and urging said tap holder sleeve against an axial stop acting between said tap holder sleeve and said pitch adapter to limit sliding travel of said tap holder sleeve in said pitch adapter.

29. The servo motor tapping unit according to claim 28 wherein said tap holder sleeve has a portion extending into said threaded one end of said adapter and receiving a snap ring abutting against an end face on said another end of said pitch adapter to comprise said axial stop.

* * * * *